Figure 1:
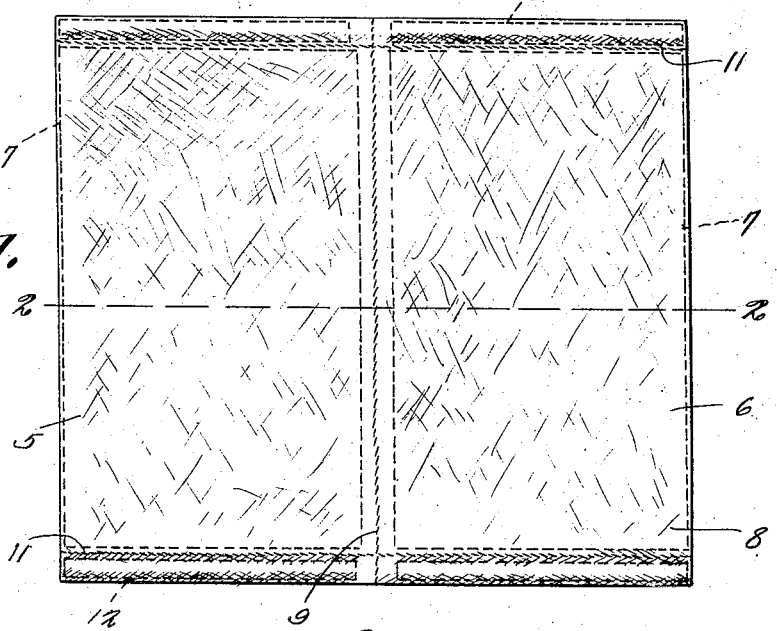

A. ERIKSON.
KNIFE CLEANER.
APPLICATION FILED APR. 1, 1920.

1,349,123.  Patented Aug. 10, 1920.

INVENTOR.
Axel Erikson,
BY
Henry J. Brewington,
ATTORNEY.

UNITED STATES PATENT OFFICE.

AXEL ERIKSON, OF BALTIMORE, MARYLAND.

KNIFE-CLEANER.

1,349,123.  Specification of Letters Patent.  Patented Aug. 10, 1920.

Application filed April 1, 1920. Serial No. 370,469.

*To all whom it may concern:*

Be it known that I, AXEL ERIKSON, a citizen of the United States, residing at Baltimore, State of Maryland, have invented certain new and useful Improvements in Knife-Cleaners, of which the following is a specification.

This invention relates to devices for cleaning or scouring table knives, forks and other articles of cutlery and the like, and its object is to provide a novel and improved device of this kind which is so constructed that the articles can be easily and rapidly cleaned and polished, and also having means for cleaning the usual shoulders at the butt end of a knife blade or a fork, where the same joins the handle.

The object stated is attained by means of a combination and arrangement of parts to be hereinafter described and claimed, and in order that the same may be better understood, reference is had to the accompanying drawing forming a part of this specification.

In the drawing—

Figure 2:
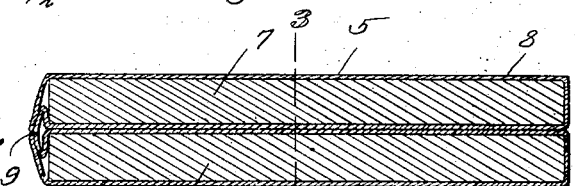
Figure 3:
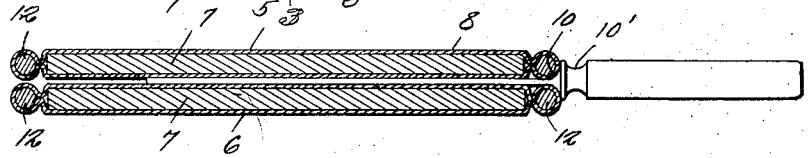
Figure 4:
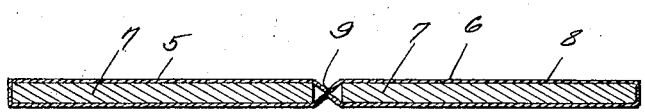
Figure 5:
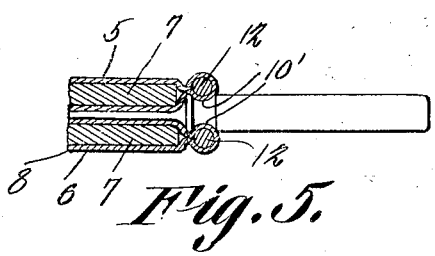

Figure 1 is a plan view of the device; Figs. 2 and 3 are sections on the lines 2—2 and 3—3, respectively, of Fig. 1; Fig. 4 is a view similar to Fig. 2 showing the device unfolded and Fig. 5 is a view similar to Fig. 3 of a portion of the device as used for cleaning the shoulders of a knife.

Referring specifically to the drawing, the device is composed of two rectangular pad-like members 5 and 6, respectively, which are flexibly connected so that they may be folded together, one on top of the other. Each member is made up of a block of wood 7, or other suitable stiff and light material, and a cover 8 of suitable textile material. Where the flexible connection between the two members is made, the latter are spaced apart a short distance, and here the top and bottom of the cover are stitched together, or otherwise united, as shown at 9, to form the flexible or hinge connection.

In use, the members 5 and 6 are folded, one on top of the other, and the knife or other article is inserted therebetween, as shown in Fig. 3. The knife is carried back and forth between the two members, the top one being pressed down with one hand, leaving the other hand free to grasp the knife to manipulate the same as stated. It will be understood that a polishing material may be placed between the members 5 and 6; or the covering 8 may be of different material on opposite sides of the device, the two members being reversible to bring either material into coöperative relation to engage the flat sides of the knife blade positioned between the members as shown in Fig. 3.

A means has also been provided for cleaning and polishing the shoulders at the butt end of the knife blade where it joins the handle. These shoulders are shown at 10 and 10' in Fig. 5. In order that the device may operate on these shoulders simultaneously with the hereinbefore described scouring action on the flat sides of the knife blade, the edges of the members 5 and 6 along which the shoulders 10 and 10' travel as the blade is moved back and forth between the rubbing surfaces of said members, have rolls which are shaped to fit the shoulders as clearly shown in Fig. 5. Each one of these roll-like rubbing surfaces is produced by forming the cover 8, along the bottom edge of the member, with a hem 11, and inserting thereinto a rod 12 of wood or other stiff material. It will therefore be seen that the projecting bead thus produced at the bottom edge of the member comes in contact with the shoulder, and the latter is cleaned by being carried back and forth along the bead as the knife is manipulated to clean and scour its flat sides as hereinbefore described. Both members 5 and 6 are provided with a bead, and hence both shoulders are operated on simultaneously.

I claim:

A cutlery scourer comprising a pair of scouring members flexibly connected to permit folding, one on top of the other, for insertion therebetween of the article to be scoured, each member being composed of a rigid block and a covering therefor, said covering at the edges of the members where the article enters therebetween being provided with a hem, and rigid rods seating in the hems to distend the same and form beads having rubbing surfaces.

In testimony whereof I affix my signature.

AXEL ERIKSON.